(12) United States Patent
Hughes et al.

(10) Patent No.: US 8,171,223 B2
(45) Date of Patent: May 1, 2012

(54) METHOD AND SYSTEM TO INCREASE CONCURRENCY AND CONTROL REPLICATION IN A MULTI-CORE CACHE HIERARCHY

(75) Inventors: Christopher J. Hughes, San Jose, CA (US); Changkyu Kim, San Jose, CA (US); Yen-Kuang Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 12/315,442

(22) Filed: Dec. 3, 2008

(65) Prior Publication Data

US 2010/0138607 A1 Jun. 3, 2010

(51) Int. Cl.
*G06F 12/08* (2006.01)
(52) U.S. Cl. ........ 711/121; 711/122; 711/140; 711/141; 711/E12.017
(58) Field of Classification Search .................. 711/121, 711/122, 140, 141, E12.017
See application file for complete search history.

(56) References Cited

U.S. PATENT DOCUMENTS

| | | | | |
|---|---|---|---|---|
| 4,464,712 A | * | 8/1984 | Fletcher | 711/122 |
| 5,636,364 A | * | 6/1997 | Emma et al. | 711/140 |
| 6,408,362 B1 | * | 6/2002 | Arimilli et al. | 711/133 |
| 7,174,430 B1 | * | 2/2007 | O'Krafka et al. | 711/141 |
| 7,774,549 B2 | * | 8/2010 | Vishin | 711/133 |
| 7,827,354 B2 | * | 11/2010 | Clark et al. | 711/122 |
| 2007/0156963 A1 | | 7/2007 | Chen et al. | 711/130 |

OTHER PUBLICATIONS

U.S. Appl. No. 12/099,502, filed Apr. 8, 2008, entitled "Detection of Streaming Data in Cache," by Changkyu Kim, et al.
Bradford M. Beckmann, et al., "ASR: Adaptive Selective Replication for CMP Caches," 2006, pp. 1-12.
Jichuan Chang, et al., "Cooperative Caching for Chip Multiprocessors," 2006, pp. 1-12.
Micahel Zhang, et al., "Victim Migration: Dynamically Adapting Between Private and Shared CMP Caches," Oct. 10, 2005, pp. 1-18.

* cited by examiner

*Primary Examiner* — Yong Choe
(74) *Attorney, Agent, or Firm* — Trop, Pruner & Hu, P.C.

(57) ABSTRACT

A directory of a private cache hierarchy is provided to maintain coherency between data stored in the cache hierarchy, where the directory is to enable concurrent cache-to-cache transfer of data to two private caches from another private cache. This directory can be implemented in a system having a multi-core processor. Other embodiments are described.

8 Claims, 6 Drawing Sheets

US 8,171,223 B2

METHOD AND SYSTEM TO INCREASE CONCURRENCY AND CONTROL REPLICATION IN A MULTI-CORE CACHE HIERARCHY

BACKGROUND

Many of today's processors are implemented as multi-core processors in which multiple or many cores are present on a single semiconductor die. Oftentimes, the cores include a first level cache, and are associated with other cache levels to store frequently or recently accessed data. One possible cache hierarchy for multi-core chips is to have one or more levels of private cache per core, and a distributed tag directory (TD) to maintain coherence between the different cores' private caches. To reduce off-die accesses to shared data, the TD may support cache-to-cache transfers between different cores' private caches. However, concurrent reads for the same cache line are serialized, and the throughput of handling requests for those shared lines is limited by the latency of pending cache-to-cache transfers. In contrast, shared cache hierarchies in which one or more cache levels are shared by multiple cores may directly respond to read requests for data being read-shared by other cores; by the nature of a shared cache, it can hold a copy of read-shared lines. The line will never move to a pending state as in the above private cache situation, so the throughput of such read requests is limited only by the shared cache request throughput.

Still further, application performance may be limited by throughput in a private cache hierarchy if the application uses many threads and the cores on which those threads run have frequent misses to the same cache line. A number of applications exhibit this behavior, and thus have lower performance on private caches than on a shared cache.

DETAILED DESCRIPTION

Embodiments provide a mechanism to increase throughput to read-shared lines in multi-core chips with private caches (i.e., not logically shared cache space). In various embodiments, different mechanisms may be used for improving throughput of read requests to heavily shared lines. As one example, a modified cache coherence protocol allows multiple simultaneous cache-to-cache (CTC) transfers of clean lines. As another implementation, a logically centralized buffer (e.g., at the TD) may be provided that holds clean lines and directly responds to read requests, eliminating cache-to-cache transfers for lines in the buffer.

Figure 1:
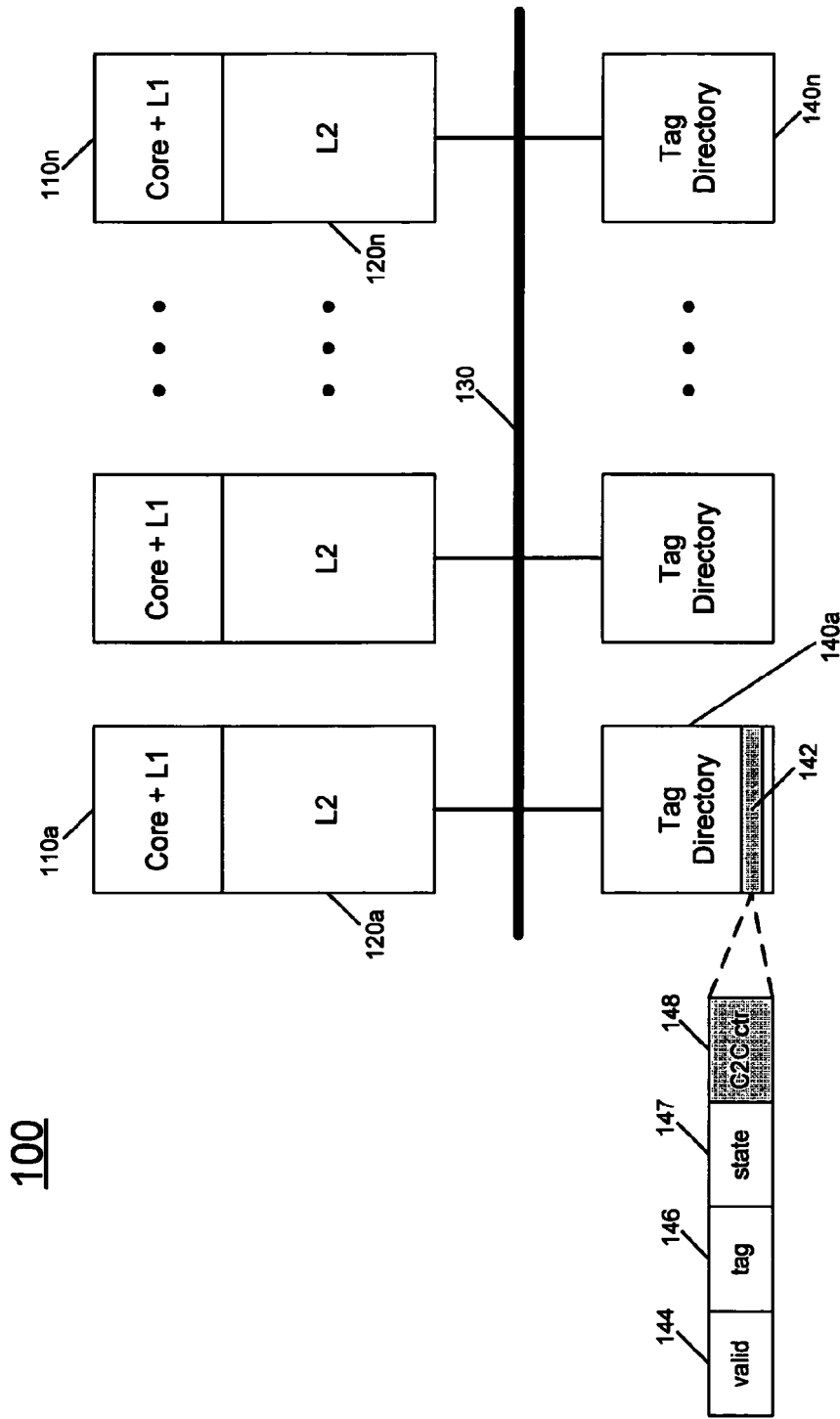
FIG. 1 is a block diagram of a multi-cache hierarchy in accordance with an embodiment of the present invention.

Referring now to FIG. 1, shown is a block diagram of a multi-cache hierarchy in accordance with an embodiment of the present invention. As shown in FIG. 1, hierarchy 100 may represent a part of a processor such as a multi-core processor including a plurality of processor cores $110_a$-$110_n$ (generically core 110). As shown in FIG. 1, each core may have a first level cache (e.g., a level 1 (L1) cache) associated therewith. Each of these caches is a private cache that stores a small amount of recently used or frequently accessed data for its associated processor core.

In turn, each core 110 may be coupled to a second level private cache, namely an associated one of a plurality of private caches $120_a$-$120_n$ (generically private cache 120), which may be level 2 (L2) caches. Again, each of these caches is a private cache that only stores data for the associated cache. In various embodiments, the cache hierarchy may be an inclusive cache hierarchy such that all of the data present in the L1 caches is also present in the corresponding L2 caches. The L2 caches may be larger than the L1 caches to thus store more data. However, a longer latency is associated with cache accesses to these L2 cache memories as they are further away from the associated processor core.

Still referring to FIG. 1, each of the cores and private caches may be coupled via an on-die interconnect 130 (e.g., a ring interconnect) such that data may be communicated therebetween. To help in determining which cache may include requested data such that the expense and latency for an off-chip memory access can be avoided, a TD $140_a$-$140_n$ (generically TD 140) is provided. TD 140 may be distributed such that each part is associated with a different one of processor cores 110 and L2 cache memories 120. TD 140 may store a plurality of entries 142 each of which may include various information associated with a cache line in a corresponding L2 cache memory. This information may indicate the location of the cache line, as well as its state and other status information associated with the line. Note that TD 140 is not backed up by data. In contrast, in a typical directory-based cache coherency system, the directory is attached at a system memory (e.g., dynamic random access memory (DRAM)) such that the directory and the memory are together, whereas TD 140 has no data attached to it.

In the specific embodiment shown in FIG. 1, each entry 142 may include a valid indicator 144 to indicate whether the corresponding line is valid, a tag field 146, which may be a portion of an address corresponding to the associated line, and a state field 147, which may identify a state of the line, e.g., with respect to a given cache coherency protocol such as a modified-exclusive-shared-invalid (MESI) protocol. In addition, other status information may be stored in state field 147. For example, where the cache coherency protocol provides for shared read access by multiple cache memories, state field 147 may include a bit vector to indicate which cache memories include a copy of the corresponding line. In one embodiment, if the number of bits that are set in this bit vector meets a threshold, then a flag may be set to indicate that at some point in time more than N cores had a copy of the corresponding line. In addition, a concurrency counter field 148 (referred to as a CTC counter) may store a count of a number of concurrent cache-to-cache transfers associated with the given cache line. Specifically, counter field 148 may store a count of a number of cache-to-cache transfers that are pending for the line. While shown with this particular implementation in the embodiment of FIG. 1, it is to be understood that other architectures are possible and furthermore that various additional fields and state may be associated with each entry of TD 140.

Given counter field 148, the coherence protocol may allow multiple CTC transfers triggered by read requests (as opposed to requests for ownership). When a TD or other control structure receives a read request for a line that is in at least one core's private cache (e.g., L2 cache) it sets the corresponding counter field 148 to one, updates the line's state to indicate that the requester's private cache now has a copy and sets a pending indicator (e.g., a bit) in state field 147, indicating at least one CTC transfer is in progress. The TD also sends a request for the CTC transfer to the core that is to fulfill the request.

If the TD receives another read request for that line, it increments the counter and sends a request for a CTC transfer (i.e., without waiting for the first request to be successfully acknowledged or completed, without storage of the second request in a pendency or other buffer, or responding with a no acknowledgment (NACK)). When the TD receives an acknowledgement that a CTC transfer of a read-shared line is complete, it decrements the counter. If the counter reaches zero, the TD changes the state of the line to indicate that there are no longer any pending requests for that line. Note that the hardware cost can be controlled by setting the size of the counter to a desired level. If the counter is at its maximum value and the TD receives another read request for the line, the TD can delay the request (e.g., buffer or NACK it).

In an alternative embodiment, a small set of counters can be stored in a separate structure inside the TD. Each entry in this structure would hold a valid bit, tag and counter. The TD would allocate an entry in this structure when a line needed one (i.e., when it received a read request for a line in at least one of the private caches), and would deallocate the entry when the counter hit zero. If the TD tried to allocate an entry for a new read request, and there were no free entries, it could delay the read request. As long as few lines need such counters simultaneously, the number of entries in this structure could be kept small with little performance impact.

Figure 2:
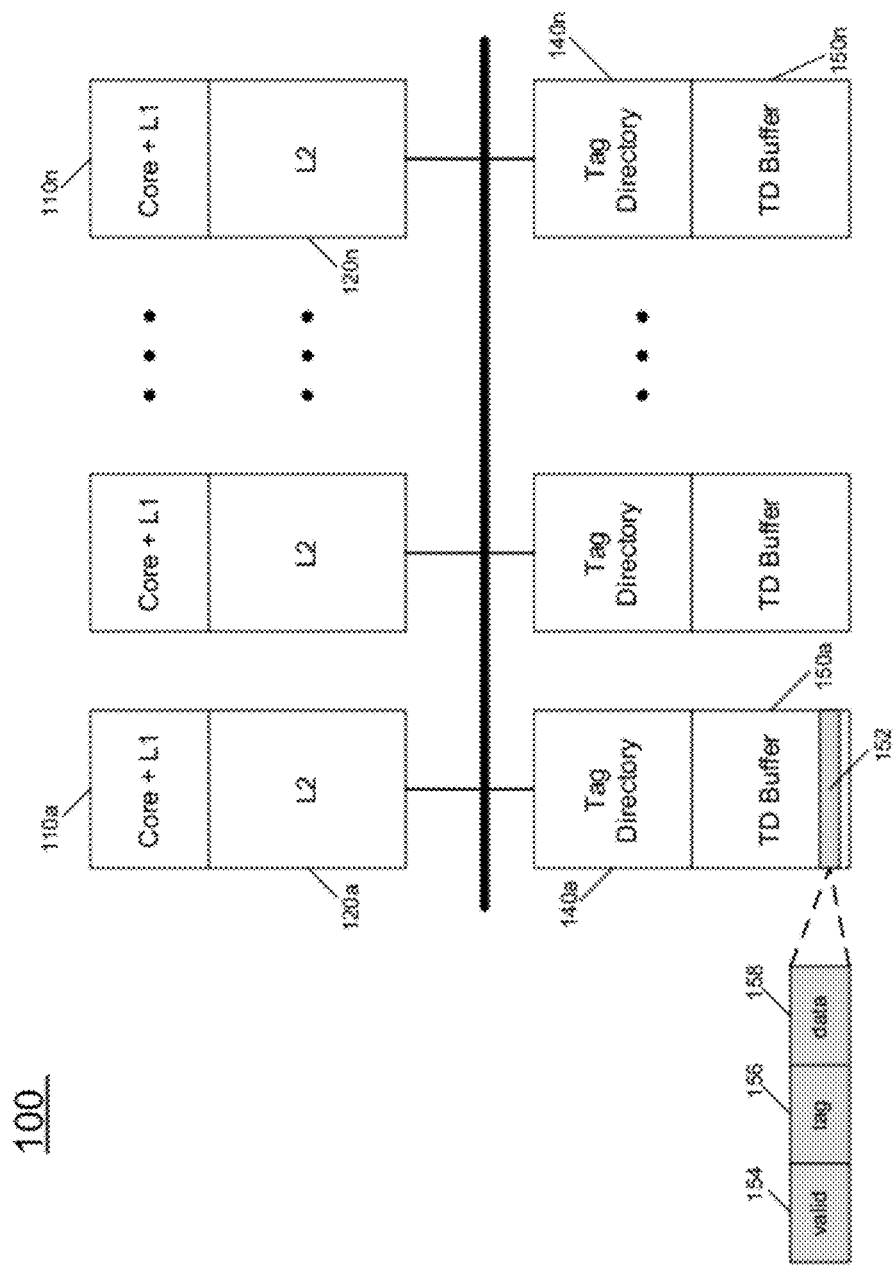
FIG. 2 is a block diagram of a cache hierarchy in accordance with another embodiment of the present invention.

In other embodiments, to implement the second mechanism described above, a buffer may be associated with the TD to hold read-shared lines. Referring now to FIG. 2, shown is a block diagram of a cache hierarchy 100' in accordance with another embodiment of the present invention. As shown in FIG. 2, hierarchy 100' may also be a hierarchy of a multi-core processor. As with the embodiment of FIG. 1, hierarchy 100' may include a plurality of cores and associated cache memories 110 and level 2 cache memories 120, which are coupled together via an on-die interconnect 130 (e.g., a ring interconnect). In the embodiment of FIG. 2, TD 140 may further have a TD buffer $150_a$-$150_n$ (generically TD buffer 150) associated with each of its distributed portions. Each TD buffer 150 may include one or more entries to store a cache line that is currently in a read-only state in one or more L2 caches. As shown in FIG. 2, TD buffer 150 may include a plurality of entries 152, each of which may store various information, including a valid indicator 154, a tag field 156, and a data field 158. Valid indicator 154 may indicate whether the corresponding entry includes valid data, while tag field 156 may indicate an address of the associated cache line in corresponding cache memory 120. In turn, data field 158 may store the actual data that is also present in that cache line of cache memory 120. While shown with this particular implementation in the embodiment of FIG. 2, other implementations are possible.

Thus each entry 152 in TD buffer 150 holds a valid bit 154, tag 156 and data 158. When a line becomes read-shared (i.e., when the TD receives a read request for a line), the TD selects one core among the cores that have the line and requests that a copy of the line be sent back to it. When a core receives a request from the TD, the core sends the data to both the TD and the original requester. When the TD receives the data, the TD places the data into an entry of TD buffer 150. Then when TD 140 receives a future read request, it checks TD buffer 150 for the line; if the line is present in an entry of TD buffer 150, the TD sends the data to the requester and updates its state information (e.g., the bit vector associated with the line). When the TD receives a write request (or request-for-ownership), it checks the buffer for the line and invalidates any matching entry.

In order to save the buffer space for lines likely to need it (and to reduce traffic to the TD), in some implementations only previously heavily shared lines may be stored into TD buffer 150. To handle such implementations, a bit may be included in each TD entry (e.g., as part of state field 147) to indicate if the line was ever simultaneously shared by some minimum number of cores (e.g., three). When a line becomes read-shared, this bit can be checked, and TD 140 will only request a copy of the line for storage in the TD buffer 150 if the bit is set. For some workloads, a single entry buffer may provide almost the same benefit as a sixteen entry buffer.

Embodiments thus provide for higher throughput of read requests to the same line for private cache systems. In addition, cache coherence protocols in accordance with an embodiment of the present invention provide support for concurrent cache-to-cache transfers to the same line.

Embodiments may further control cache-to-cache transfer of read-shared data to select a sharer to improve one or more performance characteristics. More specifically, when a TD receives a request for a read-shared line, the TD chooses which sharer to handle the CTC transfer, with consideration to performance and/or power consumption, since the selection may affect the latency of the response and the amount of on-die traffic.

Three different embodiments may be provided for choosing the sharer. These mechanisms each implement one of the following policies. First, a sharer may be selected according to an energy policy, in which energy consumption from on-die data traffic is minimized by choosing the sharer closest to the requester. Second, a sharer may be selected according to a latency policy in which latency of the response is minimized by choosing the sharer that will minimize the total number of hops for the response. As a tie-breaker for this policy, the amount of data traffic may be minimized (i.e., hops that the data itself needs to travel). Third, a sharer may be selected according to a pendency policy, in which the time that the line is in a pending coherence state is minimized by choosing the sharer that will result in acknowledgement of the CTC transfer arriving at the TD as quickly as possible. For example, if the coherence protocol is such that the selected sharer sends the acknowledgment, then this policy will select the sharer closest to the TD. This allows the TD to process the next request to a line as fast as possible, which may improve performance if a line receives a burst of requests. To clarify, this policy may be attractive if concurrent CTC transfers as described above are not permitted according to a cache coherence protocol.

Figure 3:
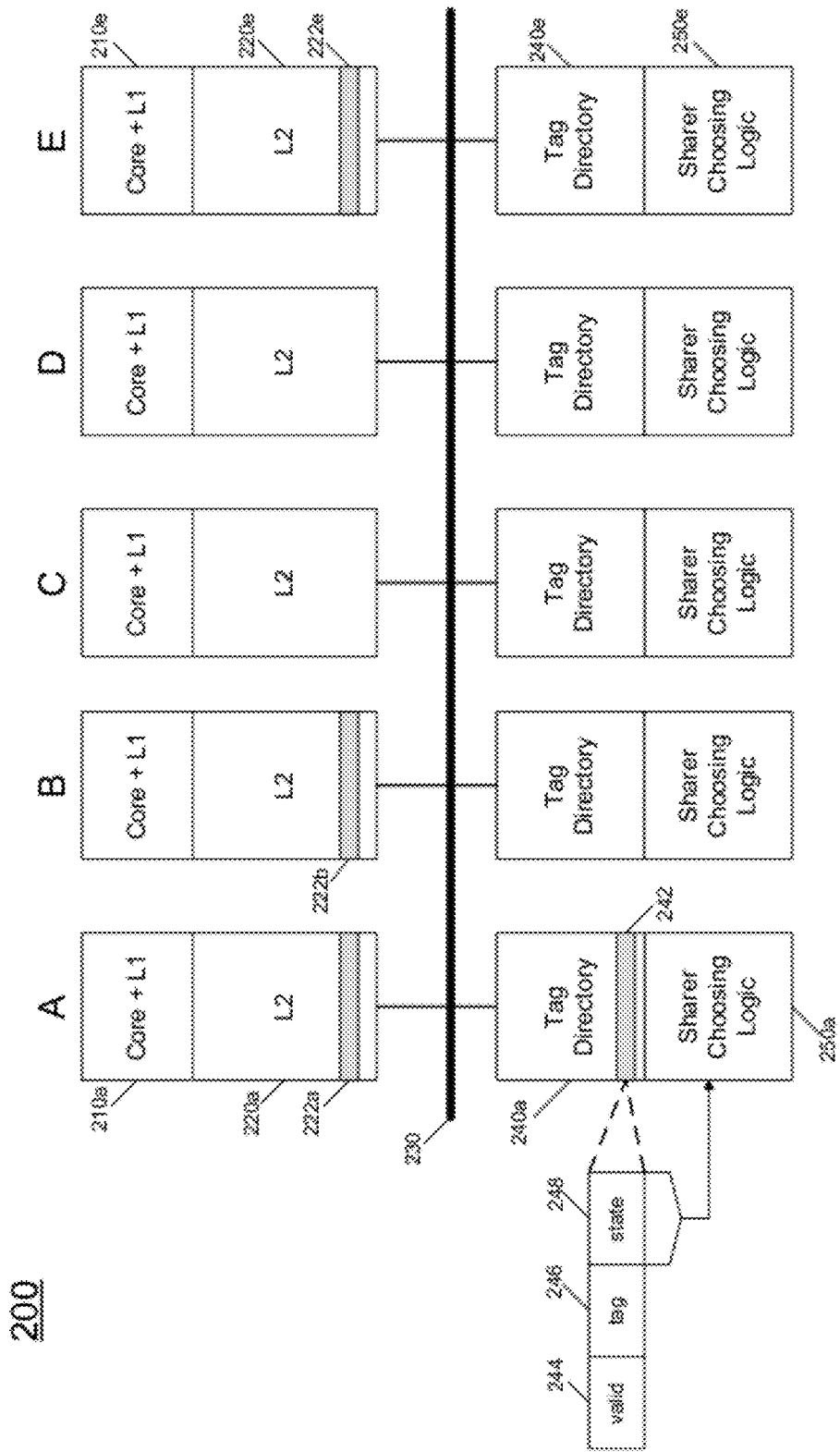
FIG. 3 is a block diagram of another cache hierarchy in accordance with an embodiment of the present invention.

Referring now to FIG. 3, shown is a block diagram of a cache hierarchy in accordance with another embodiment of the present invention. In the embodiment of FIG. 3, a cache hierarchy 200 may further include logic to select a target private cache for handling a CTC transfer in accordance with a predetermined (and non-random) policy. In the embodiment shown in FIG. 3, hierarchy 200 includes a plurality of cores and associated private caches $210_a$-$210_e$ (generically core 210). In addition, a plurality of second level private cache memories $220_a$-$220_e$ (generically private cache 220) are also present, and which are interconnected via an on-die interconnect 230 (e.g., a ring interconnect). The embodiment of FIG. 3 further includes a distributed TD $240_a$-$240_e$ (generically TD 240). To determine an appropriate private cache to handle a CTC transfer, each TD may include or be associated with a sharer choosing logic $250_a$-$250_e$ (generically logic 250). As seen, certain information from an entry 242 of TD 240 may be provided as input to logic 250. In the embodiment shown in FIG. 3, such information may include a valid indicator 244, a tag field 246 and a state field 248. Based on this information and the policy that is in place, logic 250 may choose which private cache 220 is to handle a CTC request to provide a copy of a cache line to a requesting private cache 220. While shown with this particular implementation in the embodiment of FIG. 3, understand the scope of the present invention is not limited in this regard.

When TD 240 receives a request for a line that is read-shared, sharer choosing logic 250 takes as input the state information for a read-shared line, and outputs an indication of which cache (e.g., L2 cache) the CTC request is to be sent for handling. As discussed above, three different embodiments of the invention can be effected. Note that the example system shows only five cores attached to the interconnect 230, but it is to be understood that an interconnect can have an arbitrary number of cores on it. The shaded portions indicate the presence of a read-shared line 222a, 222b and 222e in L2 caches 220 of cores A, B, and E, and the corresponding TD entry 242 for that cache line. No other cores on the interconnect 230 have a copy of the line. Assume that TD 240 has just received a read request from core D, and must choose whether to send the cache-to-cache transfer request to cache 220 of core A, core B, or core E.

According to the energy policy, the sharer that minimizes the distance that the data response needs to travel is chosen. If two sharers are the same distance from the requester, this policy chooses the one closer to the TD. In the example, since the requester is core D, core E would be chosen to handle the request (the data only needs to travel one hop from E, but two hops from B and three from A).

According to the latency policy, the sharer that minimizes the total distance that the response needs to travel is chosen (this includes the request for the CTC transfer, as well as the CTC transfer itself). If two sharers have the same total distance, this policy chooses the one closer to the requester. In the example, core B would be chosen since it has a smaller total response distance than core E and fewer data hops than core A. The total distance for core B is three hops (one hop for the CTC transfer request from the TD, and two hops for the data reply back to core D), whereas the total distance for core E is five hops (four for the CTC transfer request plus one for the data reply), and the total distance for core A is three hops (all for the data reply).

According to the pendency policy, the sharer closest to the TD is chosen. If two sharers are the same distance from the TD, this embodiment chooses the one closer to the requester. In the example, core A would be chosen since it requires no interconnect traversal at all (from TD to handling core).

Note that the different policies may be dynamically implemented, e.g., automatically or under user control. For example, based on a type of application parameters, such as a thread's data usage, a certain policy may be selected. As an example, one policy may be selected and used for one chunk of data and a different policy selected and used for a different chunk of data. Such selections can dynamically change with different operating tasks such as may be present in different portions of an application.

While the sharing of cache lines in multiple private caches by way of replicas can improve latency, such replication can have certain drawbacks, such as reducing the amount of cache capacity available for other data. Some embodiments deprioritize replica data that is part of a working set too large to fit in a single private cache; this reduces the performance and energy drawbacks of replication. To accomplish such limited replication, a mechanism to detect and record if data is part of a working set that fits in a single private cache can be used, and this information can then be retrieved on a cache miss to limit the amount of cache space occupied by replicas that do not benefit from being cached.

In this way, off-die accesses for applications can be reduced. This may improve both performance and power of multi-core chips in comparison to a system allowing uncontrolled replication in which every core's L2 cache can hold a copy of a given line. If replicated lines are not re-used in each of the L2 caches, then replication wastes L2 cache space, and triggers extra off-die accesses compared to a shared L2 cache.

Whether data is part of a working set that fits in the L2 cache can be detected by detecting re-use of cache lines after they are inserted into the L2 cache. Re-use of a line in the L2 cache indicates that it is part of a working set that is larger than the L1 cache and no larger than the L2 cache. In one embodiment re-use can be detected as follows. When a line is inserted into the L2 cache, a status indicator (i.e., a re-use or "R"-bit) associated with the line is cleared. When an L2 cache hit occurs after this cache line has been used and evicted from the L1 cache, the R-bit for that line is set, indicating the line has been re-used. Note that when a line is inserted into an L2 cache, in addition to clearing the R-bit, the L2 cache provides the requested line in turn to the L1 cache and then on to the core. When that line is later evicted from the L1 cache and thereafter requested from the L2 cache, the R-bit is set. In other words, the L1 cache needs to request it twice in order to set this indicator.

Figure 4:
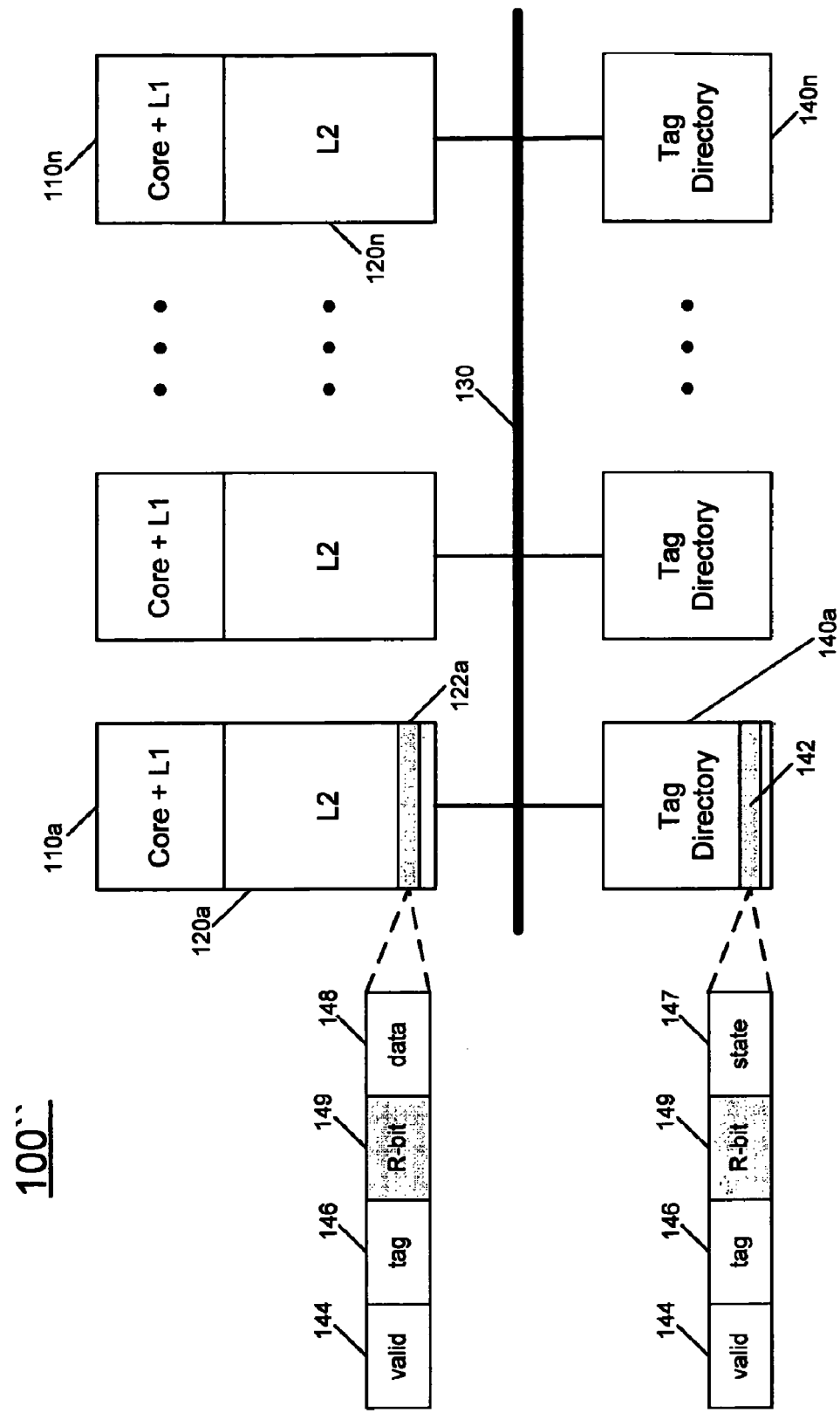
FIG. 4 is a block diagram of a cache hierarchy in accordance with yet another embodiment of the present invention.

Referring now to FIG. 4, shown is another embodiment of the present invention. As shown in FIG. 4, additional state information associated with each cache line is stored in entries 122 of private caches 120, as well as additional status information associated with each TD entry 142 may be used to control cache line replication to prevent cache pollution. As shown in FIG. 4, each entry 122 in private cache 120 includes, in addition to a valid indicator 144, a tag field 146 and a data field 148, a re-use (or R) indicator 149. In one embodiment, R indicator 149 may be a bit that is cleared when the corresponding line is written into entry 122. When a (second) hit occurs to that cache line, R indicator 149 may be set to indicate its re-use. This status indicator may be also stored in each corresponding entry 142 in TD 140. Specifically, as shown in FIG. 4, entry 142 includes an R indicator 149, in addition to a valid indicator 144, a tag field 146 and a state field 147. While shown with this particular implementation in the embodiment of FIG. 4, understand the scope of the present invention is not limited in this regard.

R-bits for future use may be stored in TD 140. When a line from a private cache 120 is evicted for non-coherence reasons (i.e., a capacity or conflict miss for another line), R-bit 149 is sent back to TD 140, which stores the bit as part of the state information for the line. Note that multiple private caches 120 may request and subsequently evict the same line, and TD 140 may hold only the most recent R-bit that it is sent for the line. Thus the value of the R-bit in private cache 120 and TD 140 may be different.

The R-bits 149 stored in TD 140 may be retrieved on cache misses that will create a replica of a line. Note that such misses will create replicas when they are reads (rather than reads-for-ownership) that hit TD 140. For these misses, if the requested line is in another private cache 120, that cache memory will be asked to send a copy of the line to the requester. TD 140 retrieves R-bit 149 for the line and sends it to the requester. In one embodiment instead of sending the R-bit directly to the requester, the TD piggybacks the R-bit onto the data reply to minimize additional traffic (i.e., it first attaches the R-bit to the request for the CTC transfer, and the responding cache attaches the R-bit to the CTC transfer itself). The TD also ensures that replies to L2 read misses carry another status indicator (which may be part of the state information presented with the data) indicating if the data in the reply is a replica or not. Note that to identify whether the incoming line is a replica or not, TD 140 may piggyback the information in the same way as it sends the R-bit to the requestor.

When a private cache 120 receives a read reply that is not a replica, it stores the line into a high priority location (e.g., the most-recently-used (MRU) position) of the corresponding set. If the line is a replica, private cache 120 examines the R-bit in the reply. If the R-bit is set, private cache 120 also treats the line as above (e.g., inserts the line into the MRU position). However, if the R-bit is cleared, private cache 120 inserts the line into a low priority location (e.g., a least-recently-used (LRU) position) of the corresponding set. This makes the line the prime candidate for replacement in that set, so that unless it is re-used again before another miss to that set, it will be evicted. This limits the fraction of cache space occupied by replicas without their R-bits set to 1/(# of ways).

Figure 5:
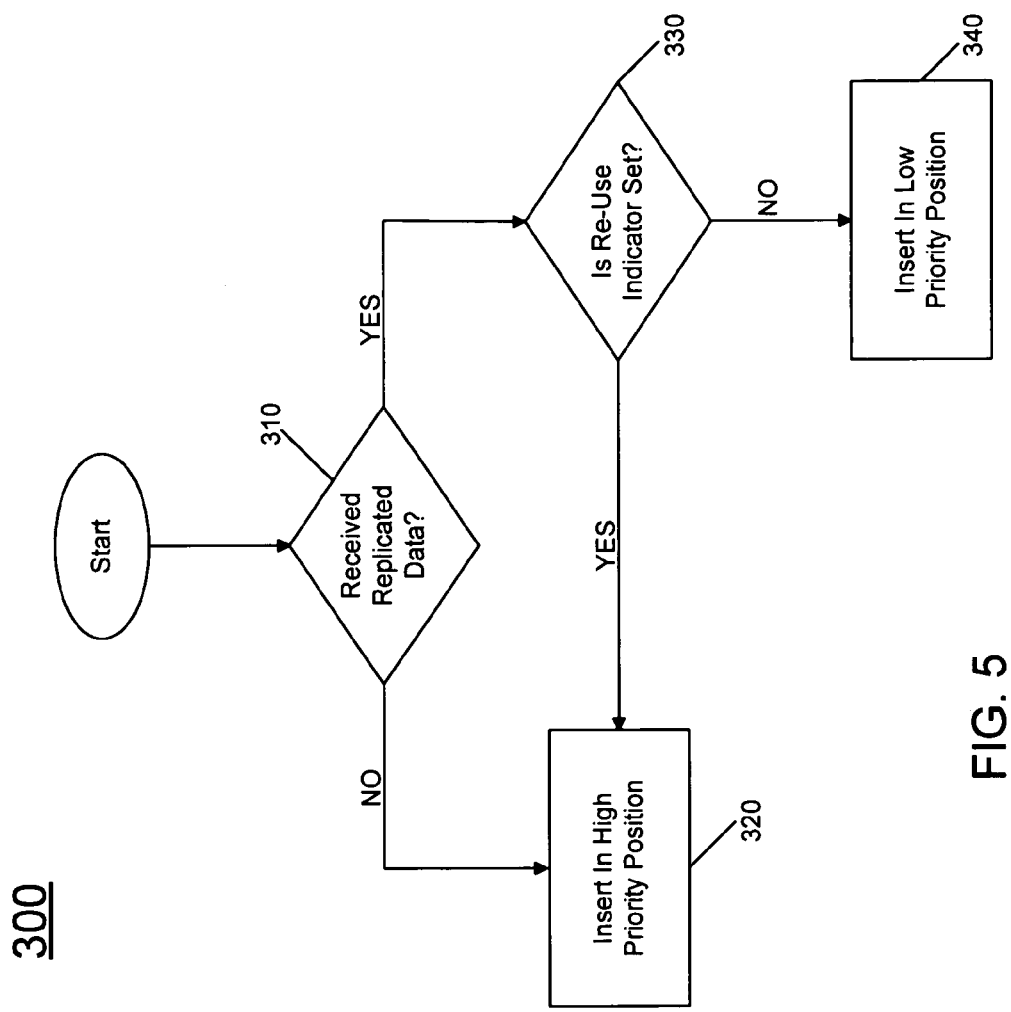
FIG. 5 is a flow diagram of a method in accordance with one embodiment of the present invention.

Referring now to FIG. 5, shown is a flow diagram of a method in accordance with one embodiment of the present invention. Method 300 may be implemented by a cache controller or other logic of a private cache, such as a cache controller of a private L2 cache. Method 300 may be implemented when incoming data is to be written into a cache line of the cache memory. As shown in FIG. 5, method 300 may begin by determining whether the received data is replicated data (diamond 310). In one embodiment, this determination may be based on the state information associated with the cache line. For example, as described above in some implementations a bit vector may be present in the TD to indicate which of the multiple private caches include a copy of the data. If more than one copy is present in the private caches, as indicated by multiple set bits within the bit vector, a shared or replica indicator may be set and sent along with the data reply. Thus, based on this indicator it may be determined whether the received data is replicated, i.e., is present in more than one private cache. If not, control passes to block 320, where the data may be stored in the private cache. More specifically, the data may be stored in an entry of a high priority entry of a set, e.g., a MRU position. In this way, the corresponding cache line may remain in the cache memory without rapid eviction.

In contrast, if instead at diamond 310 it is determined that the data received is replicated data, control passes to diamond 330 where it may be determined whether the re-use indicator associated with the cache line is set. If this indicator is set, control again passes to block 320, discussed above. Otherwise, if the re-use indicator is not set, this indicates that this replicated cache line has not been re-used. As such, the cache line may be stored in a low priority entry of a set, e.g., in an LRU position (block 340). In this way, this cache line, which may be a polluter-type line (such as part of a working set larger than the L2 cache) may be the first to be evicted from the set on a capacity eviction. While shown with this particular implementation in the embodiment of FIG. 5, understand the scope of the present invention is not limited in this regard.

Figure 6:
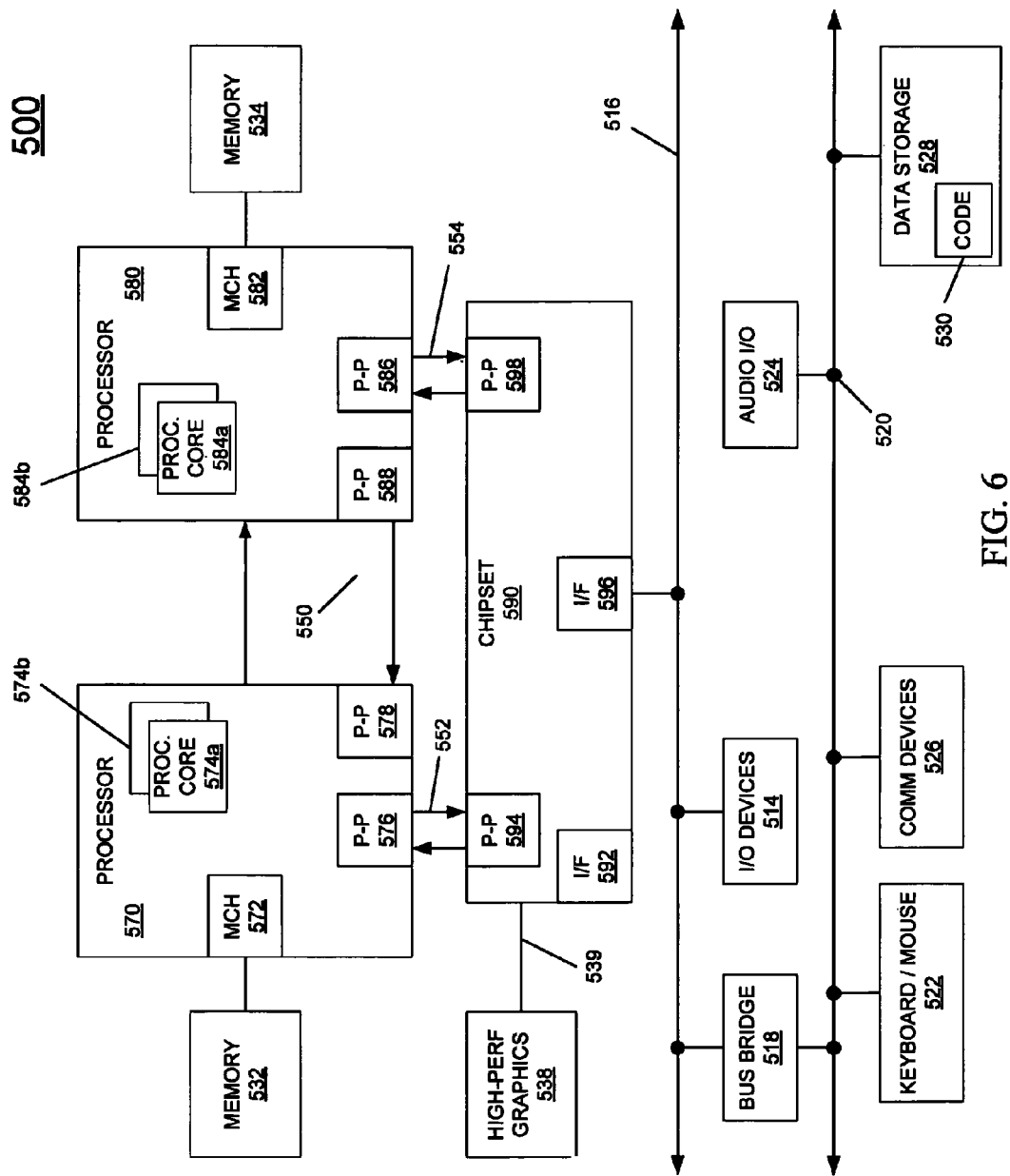
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b). Each processor may include private cache memories, including hardware, software and firmware to perform embodiments of the present invention.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538 via an interconnect 539. In turn, chipset 590 may be coupled to a first bus 516 via an interface 596. As shown in FIG. 6, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of cores each to execute instructions;
   a plurality of private caches, each associated with one of the plurality of cores, wherein each private cache is to store data only for the associated core;
   a directory to store information to maintain coherency between data stored in the plurality of private caches, wherein the directory is to allow concurrent transfers of first data stored in at least one of the private caches to a second private cache and a third private cache; and
   wherein a cache coherency protocol of the apparatus is to allow the concurrent cache-to-cache transfer to the third private cache without waiting for acknowledgement regarding the cache-to-cache transfer to the second private cache.

2. The apparatus of claim 1, wherein the directory includes a plurality of entries, each to store a state of a line in one of the private caches and a counter field to indicate a number of cache-to-cache transfers in progress for the line.

3. The apparatus of claim 2, wherein the directory is to increment the counter field responsive to a read request from one of the private caches for the line, send a cache-to-cache request to a first private cache, and to decrement the counter field responsive to an acknowledgement of the cache-to-cache request.

4. The apparatus of claim 1, wherein the directory includes a counter storage including a plurality of entries each to store a counter field to indicate a number of cache-to-cache transfers in progress for a line stored in one of the private caches.

5. The apparatus of claim 4, wherein the directory is to allocate an entry in the counter storage if a read request from one of the private caches for the line occurs when there is a pending cache-to-cache request for the line.

6. The apparatus of claim 1, further comprising a buffer associated with the directory to store the first data and to provide the first data to the second and third private caches.

7. The apparatus of claim 6, wherein the directory is to allocate an entry into the buffer responsive to a read request from the second private cache for the first data, request a copy of the first data from a first private cache, and store the copy in the allocated entry.

8. The apparatus of claim 6, wherein the directory is to allocate an entry in the buffer, if the first data has been simultaneously shared by a threshold number of the private caches.

\* \* \* \* \*